(12) United States Patent
Bekiares et al.

(10) Patent No.: US 8,825,096 B2
(45) Date of Patent: Sep. 2, 2014

(54) METHOD AND APPARATUS FOR ENABLING VOICE DISCUSSIONS AMONG INDEPENDENT AND SIMULTANEOUS USERS OF DATA CONTENT

(75) Inventors: Tyrone D. Bekiares, Chicago, IL (US); Anatoly Agulnik, Deerfield, IL (US); Donald G. Newberg, Hoffman Estates, IL (US); Steven D. Tine, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 121 days.

(21) Appl. No.: 13/331,818

(22) Filed: Dec. 20, 2011

(65) Prior Publication Data

US 2013/0156175 A1 Jun. 20, 2013

(51) Int. Cl.
*H04B 7/00* (2006.01)
*H04M 3/42* (2006.01)

(52) U.S. Cl.
USPC ...................... 455/518; 379/202.01

(58) Field of Classification Search
CPC .......... H04M 3/56; H04M 2203/5063; H04M 2250/62; H04M 2207/18; H04L 12/1822; H04W 4/10; H04W 76/005; H04W 4/08
USPC .............. 379/202.01; 455/416, 518
See application file for complete search history.

(56) References Cited

U.S. PATENT DOCUMENTS

| 7,593,691 | B2 | 9/2009 | Karabinis | |
| 8,077,635 | B2 * | 12/2011 | Shaffer et al. | 370/260 |
| 8,238,264 | B2 * | 8/2012 | Kubler et al. | 370/254 |
| 2006/0105793 | A1 * | 5/2006 | Gutowski et al. | 455/518 |
| 2008/0108339 | A1 | 5/2008 | Shaffer et al. | |
| 2008/0299940 | A1 | 12/2008 | Shaffer et al. | |
| 2009/0300518 | A1 | 12/2009 | Mock et al. | |
| 2009/0300581 | A1 | 12/2009 | Triplett | |
| 2010/0016006 | A1 | 1/2010 | Inagaki | |
| 2012/0033623 | A1 * | 2/2012 | Chu et al. | 370/329 |

FOREIGN PATENT DOCUMENTS

GB 2406468 A 3/2005

OTHER PUBLICATIONS

PCT International Search Report Dated May 10, 2013 for Counterpart Application PCT/US2012/069266.

* cited by examiner

*Primary Examiner* — Rasha Al Aubaidi
(74) *Attorney, Agent, or Firm* — Daniel R. Bestor; Steven A. May (57) ABSTRACT

Some embodiments are directed to methods and apparatuses for enabling voice discussions about a same data content being independently and simultaneously accessed on at least two devices. A server detects when a first device of the at least two devices accesses the data content. The server identifies and reserves an available voice communication group resource. Responsive to detecting that the at least two devices are independently and simultaneously accessing the data content, the server identifies and reserves an available voice communication group resource, and sends a voice group identifier for a reserved voice communication group resource to the at least two devices to allow access to the reserved voice communication group resource.

22 Claims, 5 Drawing Sheets

METHOD AND APPARATUS FOR ENABLING VOICE DISCUSSIONS AMONG INDEPENDENT AND SIMULTANEOUS USERS OF DATA CONTENT

FIELD OF THE DISCLOSURE

The present disclosure relates generally to enabling voice discussions and more particularly to enabling voice discussions among users who are independently and simultaneously accessing the same data content where each user is involved in an individual data session.

BACKGROUND

Institutional organizations, such as public safety organizations, typically use specialized voice communication systems to facilitate group discussions. Voice communication systems are typically embodied as narrowband radio systems that support low-bit-rate digital or analog transmission of voice streams. An example of such a voice communication system is a Project 25-compatible two-way Push-To-Talk voice communication system that includes wireless and wired voice communication devices. The voice communication devices may be, for example, portable narrowband two-way radios, mobile radios, dispatch consoles, or other similar voice communication entities that communicate with one another via wired and/or wireless networks. Institutional organizations choose these types of voice communications systems because they provide high end-to-end voice quality and efficient group communication, use advanced cryptography, enable centralized logging of calls, and are associated with low delay and high reliability. In addition, institutional users are familiar and comfortable with the user interface of these voice communication devices.

To facilitate group discussions among, for example, public safety users, an operating user of a voice communication device may join a voice communication group, herein known as a talkgroup, wherein a voice transmission sent from a single voice communication device joined to the talkgroup is simultaneously received by all other voice communication devices joined to the talkgroup. Voice transmissions may originate from any of the voice communication devices in the talkgroup. Institutional users may also access multimedia content, for example, video streams or web sites. The bandwidth requirements of multimedia content are generally much greater than that required for a voice communication system. Therefore, to receive multimedia content, the institutional users may also use data communication systems that are typically embodied as broadband systems. Broadband systems typically support high-bit-rate digital transmission of data streams, including real-time video. An example of such a data communication system is a wireless data network that operates in accordance with the Long Term Evolution (LTE) signaling standard and that includes wireless and wired data communication devices. The data communication devices may be, for example, laptops, smart phones, PDAs, hybrid narrowband/broadband devices, dispatch consoles, or other similar portable, mobile, or fixed data communication entities capable of receiving multimedia data content.

Unlike talkgroups discussions on voice communication devices where voice sessions include one source and many recipients (herein referred to as one-to-many media distribution), data services such as web browsing and video streaming obtained on data communication devices usually have a one to one relationship for a given data session between a data source and a data communication device (herein referred to as one-to-one distribution). Accordingly, while a first user is independently accessing a data service on a first data communication device, a second user independently accessing the same data service on a second data communication device is likely to be unaware of the simultaneous use of the data service by the first user. For example, when two public safety users are independently and simultaneously viewing the same web page or surveillance camera, each public safety user is likely to be unaware of the use of the data service by the other public safety user. In certain cases, it may be advantageous for these simultaneous users to discuss the independently retrieved data content to, for instance, facilitate collaboration not otherwise possible and consequently improve the public safety users' response to an incident. For example, if two or more police officers are independently but simultaneously viewing the same live video of an incident scene, one police officer viewing the live video may indicate an object of interest that would have otherwise gone unseen by another officer who is also viewing the video from the same surveillance camera. In another example, officers independently and simultaneously viewing a map of an incident scene may collaborate on the best way to, for example, quarantine an area.

Typical data applications used on data communication devices implement a one-to-one media distribution model for session data, i.e., sessions have one source and one recipient. Moreover, data applications are typically specialized with regard to the features they offer. For example, web servers and browsers generally do not provide voice communication services. As such, these applications typically do not provide any means to facilitate voice discussions among a group of independent, but simultaneous users accessing the same data service. Furthermore, it is difficult to predict, a priori, which users will be viewing specific data content at a given time.

One way to enable voice discussions of data content independently and simultaneously accessed by users of data communication devices is to allow a user, wishing to discuss the data content with other concurrent viewers of the same data content, to broadcast such a request on an associated voice communication device. The broadcast may be sent on an "all call" voice talkgroup, heard by all voice communication devices, to request that interested users move to another talkgroup dedicated for discussion of the data content. The "all call" voice talkgroup may be preprogrammed in a scan list of the voice communication devices. One problem with this approach is the voice broadcast seeking collaborative viewers consumes precious voice system resources. The voice broadcast may, however, be missed by a user viewing the same data content if, for example, the user's voice communication device is powered off or the user is on another call. In addition, the voice broadcast may be a nuisance to those users who are not viewing the same data content. Furthermore, the user attempting to arrange the voice discussion is unlikely to know which voice talkgroups are currently available for dynamic discussion purposes. Simply dedicating a discussion talkgroup for every data resource that could possibly be accessed (e.g. every web site) is clearly impractical.

Outside of public safety applications, certain web-based consumer systems are known to provide a feature whereby users viewing the same web content independently and simultaneously may text chat about the content. Notably, this system is not appropriate for public safety applications, where discussions are typically conducted via voice on a two-way radio system, not via text on a data device. Web-based consumer systems are also specific to web pages, and are not inclusive of other types of data services, such as video surveillance.

Accordingly, there is a need for a method and apparatus for enabling on-demand group discussions among group-based two-way radio system users who are independently and simultaneously accessing a same data content.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for enabling voice discussions about a data content being independently and simultaneously accessed on at least two devices. A server detects when a first device of the at least two devices accesses the data content. Responsive to detecting that the at least two devices are independently and simultaneously accessing the data content, the server identifies and reserves an available voice communication group resource, and provides a voice group identifier for a reserved voice communication group resource to the at least two devices to allow access to the reserved voice communication group resource.

Figure 1:
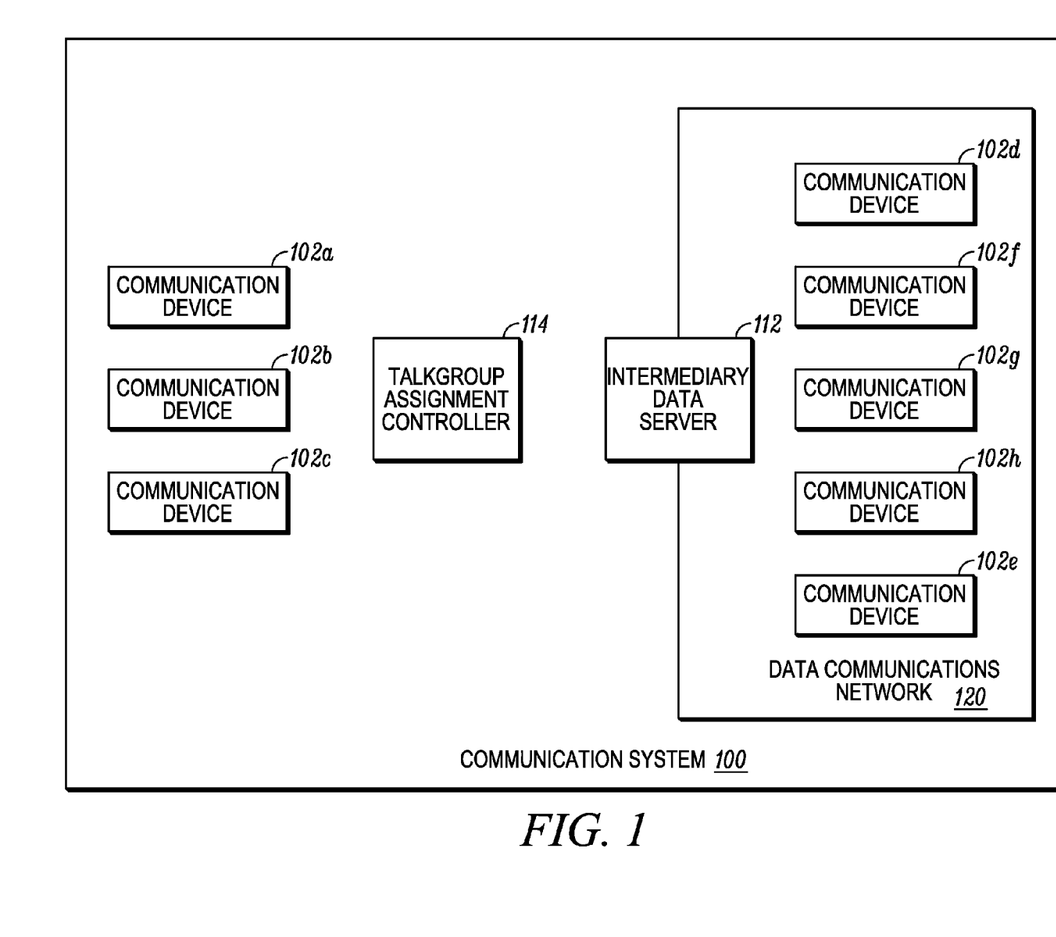
FIG. 1 is a block diagram of a communication system used in accordance with some embodiments.

FIG. 1 is a block diagram of a communication system used in accordance with some embodiments. Communication system 100 includes communication devices 102, an intermediary data server 112 and a talkgroup assignment controller 114. Communication devices 102 may be voice capable devices, data capable devices or capable of providing both voice and data services. Voice capable communication devices 102 may be, for example, portable two-way radios, mobile radios, other similar portable or mobile communication devices, a radio dispatch console, or a similar fixed communication device. Communication devices 102 capable of providing both voice and data services may be, for example, a laptop, a mobile data computer, a tablet device, a smart phone, a video console, a computer aided dispatch station, a video surveillance monitoring station, a data-capable two-way radio or mobile radio, or a similar portable, mobile, or fixed data communication device In FIG. 1, communication devices 102a, 102b and 102c are voice capable devices, communication devices 102d and 102e are capable of providing both voice and data services, and communication devices 102f, 102g and 102h are data capable devices.

Voice capable communication devices 102a-102e are used to facilitate voice communications between users and are configured to optionally encrypt and decrypt voice streams. Each voice capable communication device 102a-102e may transmit voice streams directly to other voice capable communication devices 102a-102e or through a repeater or base station (not shown). Voice capable communication devices 102a-102e may operate in a broadband/narrowband voice system that implements a one-to-many media distribution model for voice sessions, wherein voice signals sent from one voice capable communication device 102a-102e may be substantially simultaneously received by one or more voice capable communication devices 102a-102e. Voice capable communication devices 102a-102e may operate in accordance with any standardized or proprietary digital voice communication protocol, including, but not limited to, Project 25 (P25), Digital Mobile Radio (DMR), Terrestrial Trunk Radio (TETRA), Voice over IP (VoIP), or Push-To-Talk over Cellular (PoC) technologies. In some embodiments, voice capable communication devices 102a-102e communicate with a voice communication controller (not shown) to signal their affiliation to talkgroups and their intent to transmit voice communication on a talkgroup.

Data capable communication devices 102d-102h are used to receive multimedia data content, for example, a video stream or web page sent from a data source. Data capable communication devices 102d-102h may operate in a system that implements a one-to-one media distribution model for data sessions, wherein data is sent from one data source to one data capable communication device for a given data session. Data capable communication devices 102d-102h may operate in accordance with any standard or proprietary data communication protocol that allows for communication of multimedia data, including, but not limited to, IEEE 802.3, 802.11, 802.16, Long Term Evolution (LTE), Universal Mobile Telecommunication System (UMTS), Code Division Multiple Access 2000 (CDMA2000), or other data network technologies.

Intermediary data server 112 may be, for example, an enhanced web server, a web proxy or a video streaming server. Intermediary data server 112 may be placed at an ingress/egress point of a data communication network 120. In this arrangement, all requests for data content, for example, hypertext transfer protocol (HTTP) requests or video streaming requests, from data capable communication devices 102d-102h first flow through intermediary data server 112 before reaching a destination data source such as a web server or a video source. Intermediary data server 112 thus detects when at least one data capable communication device 102d-102h accesses multimedia content sent from a data source. Intermediary data server 112 may determine when multimedia content, for example, a video source or a web page, is accessed on one or more of data capable communication devices 102d-102h by, for example, monitoring the uniform resource locator (URL) associated with data requests sent from each data capable communication device 102d-102h within a given timeframe to determine if a given data content is being substantially simultaneously accessed by one or more data capable communication devices 102d-102h.

Responsive to detecting that at least one data capable communication device 102d-102h is accessing a data content, intermediary data server 112 sends a reservation request to talkgroup assignment controller 114 to reserve a talkgroup. Talkgroup assignment controller 114 may reserve a voice talkgroup on a broadband/narrowband voice communication network implementing a one-to-many media distribution model. Simultaneous viewers of the same data content may therefore use associated voice capable communication devices 102a-102e to facilitate ad hoc group voice conversations among the simultaneous viewers of the data content. For example, if users on communication devices 102e, 102g and 102h are simultaneously accessing the same data content, the user on communication device 102e can use communication device 102e for voice conversation because communication device 102e is capable of providing both voice and data services. The users on data capable communication device 102g and 102h may be associated with voice capable communication devices 102b 102c, respectively, and they may use voice capable communication devices 102b 102c for ad hoc group voice conversations with the user accessing the same data content on communication device 102e. Associations between voice and data-only capable devices may be maintained at the talkgroup assignment controller 114 via, for example, a lookup table.

According to some embodiments, when intermediary data server 112 detects that at least one data capable communication device 102 is accessing the data content, intermediary data server 112 reserves an available voice communication group resource, such as a talkgroup resource. When intermediary data server 112 detects that two or more data capable communication devices 102d-102h are simultaneously accessing the same data content, intermediary data server 112 makes known, to the two or more data capable communication devices 102d-102h simultaneously accessing the data content, an identifier for the reserved voice communication group resource. Users associated with the two or more data capable communication devices 102d-102h may then use associated voice capable communication devices 102a-102e to have group voice discussions on the reserved voice communication group resource, while the data capable communication devices 102d-102h are simultaneously accessing the same data content. Using the example above, users on communication devices 102e, 102g and 102h, simultaneously accessing the same data content, may then use associated voice capable communication devices 102e, 102b and 102c to have group voice discussions on the reserved voice communication group resource. Intermediary data server 112 monitors the number of data capable communication devices 102d-102h simultaneously accessing the data content or actively using the reserved voice communication group resource and may release the reserved voice communication group resource if, for example, the number of data capable communication devices 102d-102h falls below a predefined threshold (for example falls below two or one), is at a predefined threshold (for example one or zero), or after a predetermined time-out period (e.g., between 1 and 30 minutes).

Some embodiments discussed herein do not require changes to the content source (e.g. video surveillance systems or web servers), the two-way radio system (standard talkgroup behaviors), or the end applications (video clients or web browsers). In a system where voice capable communication devices 102a-102e are, for example, narrowband voice subscriber radios or broadband voice subscriber radios, the voice communication group resource may be reserved from a block of pre-allocated talkgroups, wherein talkgroups may be specifically allocated for group voice discussions about individually and simultaneously accessed data sources. These specifically allocated talkgroups may be provisioned as virtual channels on a provisioned channel grouping, for example "Data Conversations", of each voice capable communication device 102a-102e. To enable voice capable communication devices 102a-102e to join an associated voice discussion for a given data stream, voice capable communication devices 102a-102e may be switched to the "Data Conversation" channel group and a channel knob on voice capable communication devices 102a-102e may be turned to a position indicated by an advertised talkgroup identifier for the reserved talkgroup. Therefore, in some embodiments, no changes need to be made to the system in which voice capable communication devices 102a-102e operate. Additionally or alternatively, the reserved talkgroup identifier may be dynamically added to the scan list of the collaborative voice capable communication devices 102a-102e rather than changing its primary talkgroup affiliation. This would prevent the voice capable communication devices from missing voice communications on a primary talkgroup while listening for discussions related to the data content.

Continuing with the example where communication devices 102e, 102g and 102h are simultaneously accessing the same data content, in order to advertise the reserved talkgroup identifier, intermediary data server 112 may modify data returned to communication devices 102e, 102g and 102h to include the reserved talkgroup identifier. For example, a web proxy may modify a returned HTML source code (markup) associated with data content requested on communication devices 102e, 102g and 102h to include a pop-up window or the like advertising the reserved talkgroup identifier. Similarly, an intermediary video server may overlay the reserved talkgroup identifier on top of the transcoded video via a character generator function. Thus, some embodiments require no changes to the voice system, the broadband client, or the data source, and do not require any explicit binding of broadband data users to voice users.

If data returned to one of communication devices 102e, 102g and 102h cannot be modified by intermediary data server 112, the reserved talkgroup identifier may be conveyed to communication devices 102e, 102g and 102h via an out-of-band mechanism, with respect to the data content. In one embodiment, a dynamic regroup feature available on the voice communication system may be used to automatically place associated voice capable communication devices into a reserved talkgroup. To use the dynamic regroup feature, broadband data user identities may be mapped to, for example, communication service device identifiers using a lookup mechanism known in the art. The list of communication service device identifiers can be used to request that the narrowband/broadband system dynamically regroup the voice capable communication devices 102a-102e of users actively viewing the same data content into a dedicated voice talkgroup.

In another embodiment where the identifier of the reserved talkgroup is transmitted out-of-band with respect to the data content, the reserved talkgroup identifier may be advertised directly to the communication service devices via a Text Messaging Service (TMS) or the like. In these cases, the broadband data user identities are first mapped to communication service device identifiers using a lookup mechanism known in the art. Using the list of voice communication device identifier, a text message including the reserved talkgroup identifier may be sent to the voice capable communication devices of users actively viewing the broadband data content.

In yet another embodiment where the identifier of the reserved talkgroup is transmitted out-of-band with respect to the data content, the identifier could be transmitted to the data capable communication device via an ancillary data channel. Other examples are possible as well.

In instances when the reserved talkgroup identifier is received on data capable communication device 102d-102h, it may be transferred manually or automatically to the coupled voice capable communication device. If manually transferred, channel group and/or channel selection controls may be manipulated to select the advertised talkgroup identifier. Alternatively, the reserved talkgroup identifier could be automatically transferred to the voice capable communication devices via a peer-to-peer protocol, for example via Bluetooth.

As noted above, intermediary data server 112 monitors the number of data capable communication devices (in the example above communication devices 102e, 102g and 102h) simultaneously accessing the data content or the number of voice communication devices (in the example above communication devices 102e, 102b and 102c) actively using the reserved talkgroup resource and may release the reserved talkgroup resource if, for example, the numbers of data capable communication devices or voice capable communication devices falls to the predefined threshold, or when a timeout occurs after the number of data capable communication devices accessing the data content falls to the predefined threshold. The reserved talkgroup resource may also be released when a timeout occurs after there no voice activity on the reserved talkgroup for a period of time. This would require intermediary data server 112 to monitor push-to-talk activity on the reserved talkgroup. The reserved talkgroup resource may also be released when a timeout occurs at a predefined period after when intermediary data server 112 assigns the reserved talkgroup resource, but detects no affiliations with the reserved talkgroup resource.

Figure 2:
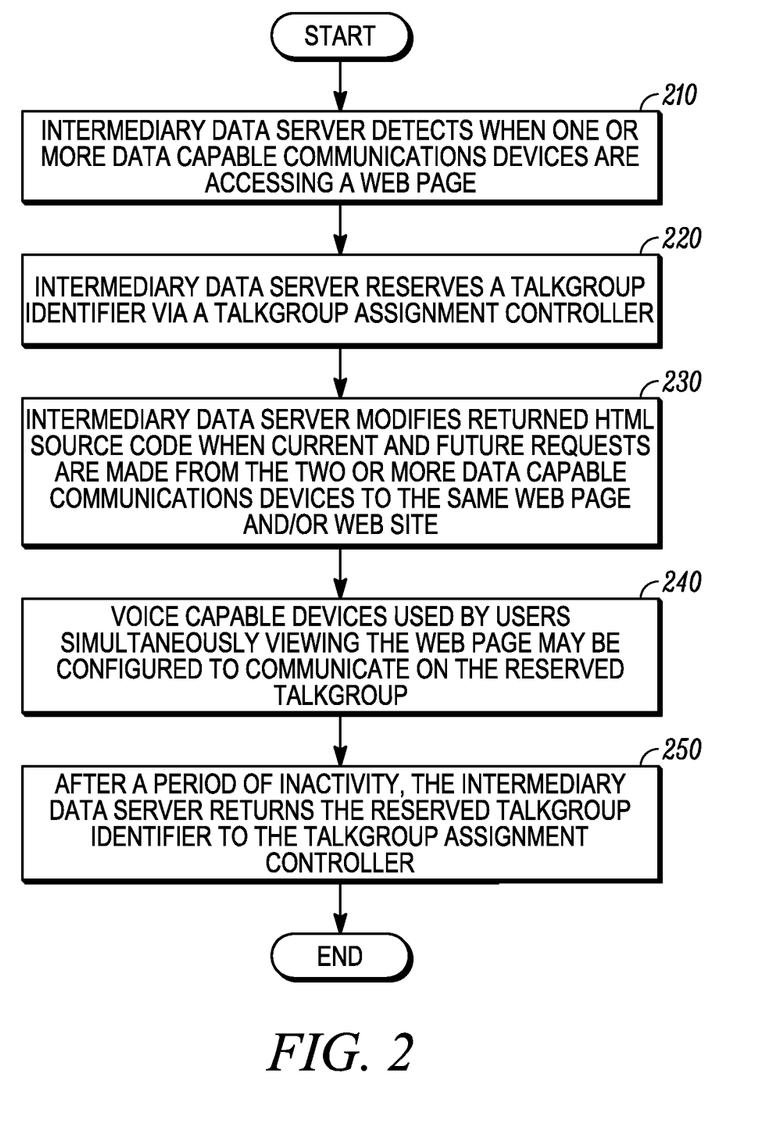
FIG. 2 is a flow diagram of a method implemented when the intermediary data server functions as an enhanced web proxy in accordance with some embodiments.

FIG. 2 is a flow diagram 200 of a method implemented when an intermediary data server functions as an enhanced web proxy in accordance with some embodiments. In 210, the intermediary data server detects when one or more data capable communications devices are accessing a web page. Thus, the intermediary data server can detect when two or more data capable communications devices are simultaneously accessing the same web page and/or web site. In 220, the intermediary data server reserves a talkgroup identifier from a talkgroup assignment controller. In 230, the intermediary data server modifies returned HTML source code when current and future requests are made from the two or more data capable communications devices to the same web page and/or web site. The returned HTML source code may be modified to include a script, which when executed by the data capable device's browser, advertises the reserved talkgroup identifier for voice discussion relevant to the web site content, among other possibilities. In 240, voice capable devices used by users simultaneously viewing the web page may be configured to communicate on the reserved talkgroup. In 250, after a period of inactivity, the intermediary data server returns the reserved talkgroup identifier to the talkgroup assignment controller.

Figure 3:
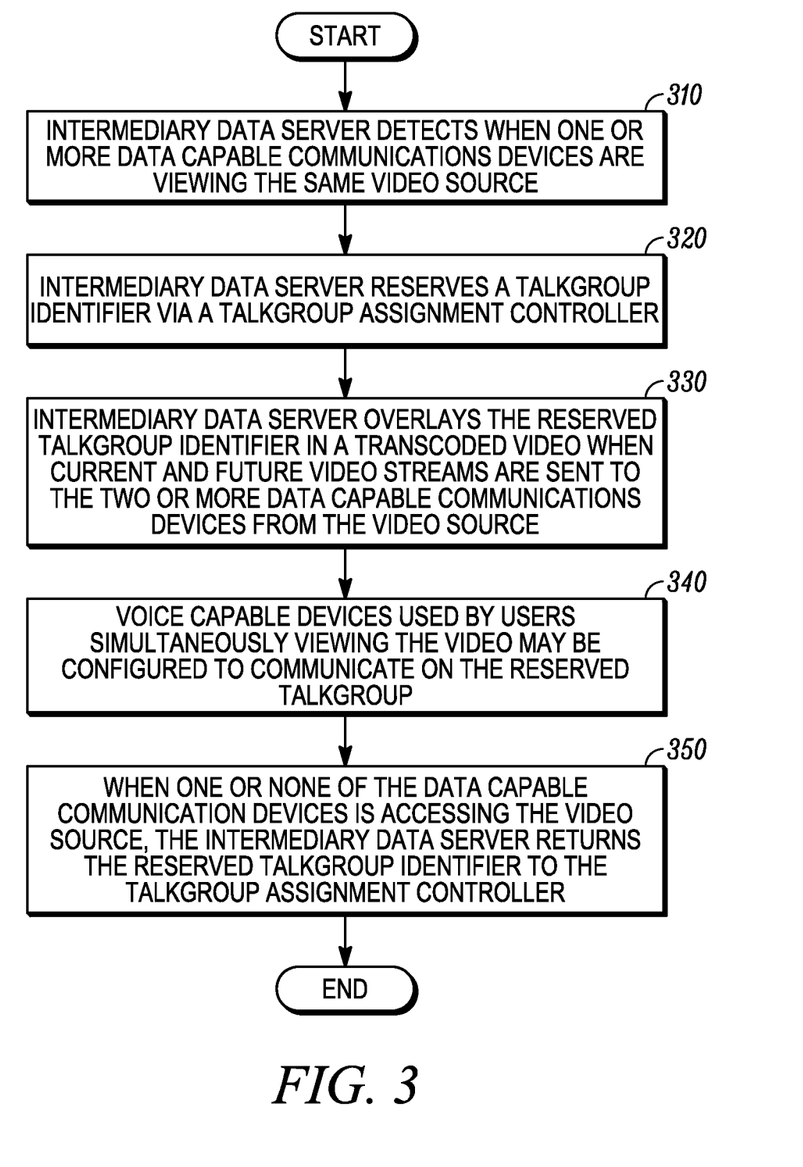
FIG. 3 is a flow diagram of a method implemented when the intermediary data server functions as video streaming server in accordance with some embodiments.

FIG. 3 is a flow diagram of a method implemented when the intermediary data server functions as a video streaming server in accordance with some embodiments. In 310, the intermediary data server detects when one or more data capable communications devices are viewing a same video source. Thus, the intermediary data server can detect when two or more data capable communications devices are simultaneously viewing the same video source. In 320, the intermediary data server reserves a talkgroup identifier via a talkgroup assignment controller. In 330, the intermediary data server overlays the reserved talkgroup identifier in a transcoded video when current and future video streams are sent to the two or more data capable communications devices from the video source, among other possibilities. In 340, voice capable devices used by users simultaneously viewing the video may be configured to communicate on the reserved talkgroup. In 350, when one or none of the data capable communication devices is accessing the video source, the intermediary data server returns the reserved talkgroup identifier to the talkgroup assignment controller.

Figure 4:
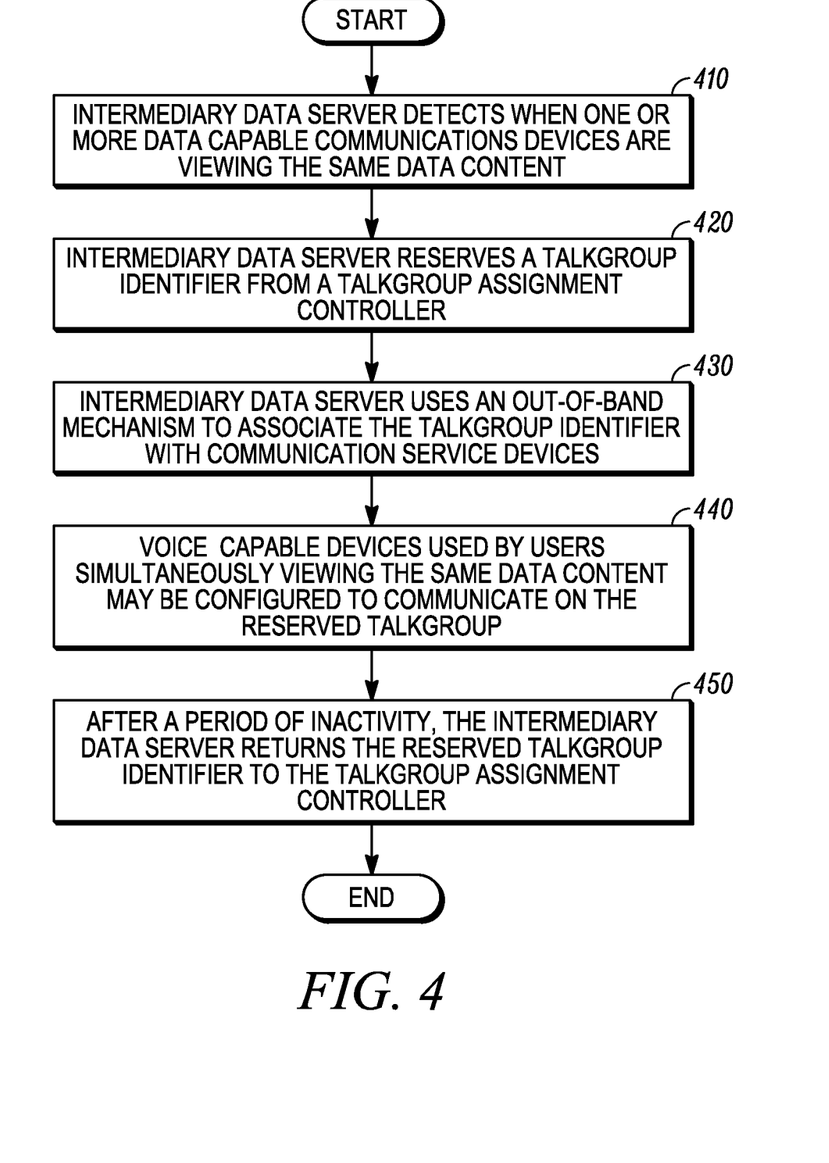
FIG. 4 is a flow diagram of a method for conveying the reserved talkgroup identifier to communication devices via an out-of-band mechanism, with respect to the data content, in accordance with some embodiments.

FIG. 4 is a flow diagram of a method for conveying the reserved talkgroup identifier to communication devices via an out-of-band mechanism, with respect to the data content, in accordance with some embodiments. In 410, the intermediary data server detects when one or more data capable communications devices are viewing the same data content. Thus, the intermediary data server can detect when two or more data capable communications devices are simultaneously viewing the same data content. In 420, the intermediary data server reserves a talkgroup identifier via a talkgroup assignment controller. In 430, the intermediary data server uses an out-of-band mechanism to associate the talkgroup identifier with communication service devices. For example, the intermediary data server uses a dynamic regroup feature to automatically place associated voice capable communication devices into a reserved talkgroup, a Text Messaging Service (TMS) to directly advertise the talkgroup identifier to communication service devices, or an ancillary data channel to transmit the talkgroup identifier to data capable communication devices. In 440, voice capable devices used by users simultaneously viewing the same data content may be configured to communicate on the reserved talkgroup. In 450, after a period of inactivity, the intermediary data server returns the reserved talkgroup identifier to the talkgroup assignment controller.

The intermediary data server may use a number of embodiments to detect when two or more users are viewing the same data content. In some embodiments, the intermediary data server may examine a whole or part of a Universal Resource Locator (URL) to sufficiently identify specific data content. In some embodiments, the data content may be identified by a requested object. In other embodiments, the data content may be identified by a portion of the path to the requested object. There may not always be a 1:1 relationship between the specific data content requested and an assigned talkgroup resource. Many specific data content objects may be assigned to the same assigned talkgroup resource. It should be obvious to one skilled in the art that any whole or partial form of data content address may be used to identify data content, including URIs, IP addressing, and the like.

When serving as a web proxy, the intermediary data server could be administratively configured to only provide the reserved talkgroup identifiers when two or more data capable communication devices are viewing the same page, the same site, or the same portion of a site. When serving as a video streaming server, the intermediary data server could be administratively configured to only provide the reserved talkgroup identifiers when two or more data capable communication devices are viewing the same camera live, viewing the same camera at different points in source time, or viewing cameras in the same building or vicinity. The intermediary data server could be administratively configured to only provide reserved talkgroup identifiers when it is administratively enabled.

In some embodiments, the intermediary data server could indicate to the data capable communication devices the number and identity (if known) of users simultaneously viewing the same content. A voice communication controller could be configured to alert the intermediary data server whenever the voice communication controller receives an affiliation request for the reserved talkgroup, and the intermediary data server could indicate to the data capable communication devices the number and presence of users in a discussion group to, for example, help data users decide if they want to join the discussion group. The voice communications controller could alert the intermediary data server whenever a user in the reserved talkgroup generates a talk request, such that the intermediary data server could indicate to the data capable communication devices if someone is currently talking on the discussion group.

Figure 5:
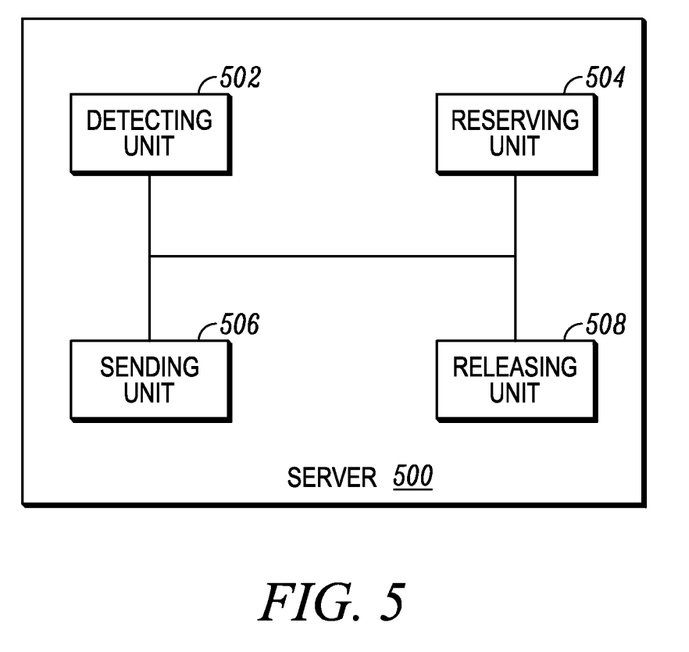
FIG. 5 is a block diagram of an intermediate server used in accordance with some embodiments.

FIG. 5 is a block diagram of an intermediate server used in accordance with some embodiments. Server 500 enables voice discussions about a data content being independently and simultaneously accessed on at least two data capable communication devices. Server 500 includes a detecting unit 502, a reserving unit 504, a notification unit 506 and a releasing unit 508. Detecting unit 502 is configured to detect when a first data capable communication device of the at least two devices accesses the data content. Reserving unit 504 is configured to identify and reserve an available voice communication group resource. Responsive to detecting that the at least two data capable communication devices are independently and simultaneously accessing the data content, sending unit 506 is configured to send a voice group identifier identifying the reserved voice communication group resource to at least two devices to allow access to the reserved voice communication group resource. Releasing unit 508 is configured to release the reserved voice communication group resource responsive to determining that a number of data capable communication devices independently and simultaneously accessing the data content or a number of voice capable communication devices accessing the reserved voice communication group resource meets a predefined criterion.

Server 500, for example, can be an integrated unit containing at least all the elements depicted in FIG. 5, as well as any other elements necessary for the server to perform its particular functions. Alternatively, server 500 can include a collection of appropriately interconnected units or devices, wherein such units or devices perform functions that are equivalent to the functions performed by the elements of the server 500. In some embodiments, server 500 may include a random access memory and a programmable memory that are coupled to a processor. The processor may include ports for coupling to wireless network interfaces. The wireless network interfaces can be used to enable server 500 to communicate with other node devices in an ad hoc wireless network or mesh network. The programmable memory can store operating code (OC) for the processor and code for performing functions associated with server 500. For example, the programmable memory can include computer readable program code components configured to cause execution of a method for enabling voice discussions among at least two users independently and simultaneously accessing data content on respective data devices as described herein. For example, OC associated with the detecting unit 502 and for performing the detecting steps set forth in FIGS. 2-4 may be stored in the programmable memory. OC associated with the reserving unit 504, the notification unit 506 and the releasing unit 508 and for performing the respective reserving, notification, and releasing steps set forth in FIGS. 2-4 may also be stored in the programmable memory. Additionally, the functional blocks iterated in FIG. 5 may instead be a part of other well known system elements, such as a firewall, or a data content server.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of enabling group voice discussions about a same data content being independently and simultaneously accessed on at least two data-enabled communications devices, the method comprising:
   detecting that the at least two data-enabled communications devices are independently and substantially simultaneously accessing the same data content; and
   responsive to the detecting that the at least two data-enabled communications devices are independently and substantially simultaneously accessing the same data content:
      identifying and reserving an available voice communication group resource; and
      providing a voice group identifier for the reserved voice communication group resource to at least two voice-enabled group communications devices associated with the at least two data-enabled communications devices to allow access to the reserved voice communication group resource, such that a subsequent voice transmission sent from either one of the at least two voice-enabled group communications devices using the voice group identifier is forwarded to all other voice-enabled group communications devices joined to the reserved voice communication group resource.

2. The method of claim 1, further comprising releasing the reserved voice communication group resource responsive to determining that a number of data-enabled communications devices independently and simultaneously accessing the same data content or a number of voice-enabled group communications devices accessing the reserved voice communication group resource meets a predefined criterion.

3. The method of claim 2, wherein the releasing comprises releasing the reserved voice communication group resource responsive to determining that one of:
   the number of data-enabled communications devices accessing the same data content is at or below a predefined threshold,
   a time-out period has expired after the number of data-enabled communications devices accessing the same data content is at or below a predefined threshold,
   a time-out occurred after no activity is detected on voice-enabled group communications devices allowed access to the reserved voice communication group resource, and
   a time-out occurred after a predefined period when the voice communication group resource is reserved and responsive to detecting no attempt to access the reserved voice communication group resource from voice-enabled group communications devices allowed access to the reserved voice communication group resource.

4. The method of claim 1, wherein responsive to receiving the voice group identifier, the at least two data-enabled communications devices are used in a talkgroup discussion.

5. The method of claim 1, wherein the detecting comprises transmitting all requests for the same data content sent from the at least two data-enabled communications devices through an intermediary server before sending the requests to a data source included in the requests.

6. The method of claim 1, wherein the detecting comprises using a uniform resource locator included in the requests sent from the at least two devices within a given time frame to determine if the same data content associated with the uniform resource locator requests is being accessed by the at least two data-enabled communications devices.

7. The method of claim 1, wherein the reserving comprises reserving the voice communication group resource on a voice system implementing a one-to-many media distribution model, wherein the two or more voice-enabled group communications devices on the voice system are configured to facilitate ad hoc group voice conversation about the independently and substantially simultaneously accessed same data content accessed by the at least two data-enabled communications devices.

8. The method of claim 1, wherein the reserving comprises reserving the voice communication group resource from a block of pre-allocated talkgroups for group discussions about the independently and substantially simultaneously accessed same data content accessed by the at least two data-enabled communications devices.

9. The method of claim 8, wherein the block of pre-allocated talkgroups are provisioned as virtual channels on each of the at least two voice-enabled group communications devices, wherein each voice-enabled group communications device is engaged in talkgroup discussions when the virtual channel indicated by the talkgroup identifier is selected on the voice-enabled group communications device, or
   wherein each voice-enabled group communications device is engaged in talkgroup discussions when the virtual channel indicated by the talkgroup identifier is added into a scan list of the voice-enabled group communications device.

10. The method of claim 1, wherein the at least two voice-enabled group communications devices are different from the at least two data-enabled communications devices; and
   wherein the reserving comprises mapping identifiers associated with the at least two data-enabled communications devices to voice device identifiers associated with the at least two voice-enabled group communications devices and providing the voice group identifier for the reserved voice communication group resource to the at least two voice-enabled group communications devices using the voice device identifiers.

11. The method of claim 1, wherein one of the at least two voice-enabled group communications devices is the same device as one of the at least two data-enabled communications devices.

12. The method of claim 1, wherein the sending comprises modifying the same data content requested on the at least two data-enabled communications devices to include the voice group identifier.

13. The method of claim 1, wherein the sending comprises sending the voice group identifier to the at least two data-enabled communications devices via an out-of-band mechanism.

14. The method of claim 1, wherein the sending comprises using a dynamic regroup feature to automatically place the at least two voice-enabled communications devices allowed access to the reserved voice communication group resource in a same talkgroup.

15. A server for enabling group voice discussions about a same data content being independently and simultaneously accessed on at least two data-enabled communications devices, the server configured to:
   detect that the at least two data-enabled communications devices are independently and substantially simultaneously accessing the same data content; and
   responsive to the detecting that the at least two data-enabled communications devices are independently and substantially simultaneously accessing the same data content:
      identify and reserve an available voice communication group resource; and
      provide a voice group identifier for the reserved voice communication group resource to at least two voice-enabled group communications devices associated with the at least two data-enabled communications devices to allow access to the reserved voice communication group resource, such that a subsequent voice transmission sent from either one of the at least two voice-enabled group communications devices using the voice group identifier is forwarded to all other voice-enabled group communications devices joined to the reserved voice communication group resource.

16. The server of claim 15, further configured to release the reserved voice communication group resource responsive to determining that a number of data-enabled communications devices independently and simultaneously accessing the same data content or a number of voice-enabled group communications devices accessing the reserved voice communication group resource meets a predefined criterion.

17. The server of claim 16, further configured to release the reserved voice communication group resource responsive to determining that:
   the number of data-enabled communications devices accessing the same data content is at or below a predefined threshold,
   a time-out period has expired after the number of data-enabled communications devices accessing the same data content is at or below a predefined threshold,
   a time-out occurred after no activity is detected on voice-enabled group communications devices allowed access to the reserved voice communication group resource, or
   a time-out occurred after a predefined period when the voice communication group resource is reserved and responsive to detecting no attempt to access the reserved voice communication group resource from voice-enabled group communications devices allowed access to the reserved voice communication group resource.

18. The server of claim 15, wherein the server is connected to an ingress/egress point of a data network and is further configured to detect requests for the same data content sent from the at least two data-enabled communications devices through an intermediary server before sending the requests to a data source included in the requests.

19. The server of claim 15, further configured to use a uniform resource locator included in the requests sent from the at least two data-enabled communications devices within a given time frame to determine if the same data content associated with the uniform resource locator requests is being accessed by the at least two data-enabled communications devices.

20. The server of claim 15, further configured to reserve the voice communication group resource from a block of pre-allocated talkgroups for group discussions about the independently and simultaneously accessed same data content on the at least two voice-enabled group communications devices.

21. The server of claim 20, wherein the block of pre-allocated talkgroups are provisioned as virtual channels on each voice-enabled group communications device, wherein each voice-enabled group communications device is engaged in talkgroup discussions when the virtual channel indicated by the talkgroup identifier is selected on the voice-enabled group communications device, or
   wherein each voice-enabled group communications device is engaged in talkgroup discussions when the virtual channel indicated by the talkgroup identifier is added into a scan list of the voice-enabled group communications device.

22. The server of claim 15, wherein the same data content is a video stream.

* * * * *